United States Patent [19]

Suzuki

[11] 3,943,568

[45] Mar. 9, 1976

[54] MAGNETIC HEAD HEIGHT CHANGING DEVICE

[75] Inventor: Tatsuro Suzuki, Nagoya, Japan

[73] Assignee: Yupiteru Ongaku Kogyo Kabushikikaisha, Tokyo, Japan

[22] Filed: Apr. 8, 1974

[21] Appl. No.: 458,872

[30] Foreign Application Priority Data

May 4, 1973 Japan............................ 48-52934[U]

[52] U.S. Cl. ............................................... 360/106
[51] Int. Cl.² .......................................... G11B 21/08
[58] Field of Search ................ 360/106, 109; 274/4

[56] References Cited
UNITED STATES PATENTS

| | | | |
|---|---|---|---|
| 3,628,796 | 12/1971 | Ban..................................... | 360/106 |
| 3,663,022 | 5/1972 | Ban..................................... | 360/106 |
| 3,781,018 | 12/1973 | Cayton................................ | 360/106 |

*Primary Examiner*—Alfred H. Eddleman
*Assistant Examiner*—Jay P. Lucas
*Attorney, Agent, or Firm*—Hill, Gross, Simpson, Van Santen, Steadman, Chiara & Simpson

[57] ABSTRACT

A magnetic head height changing apparatus is disclosed which is provided with a cam mechanism with a cam surface and claws, a pulley or gear device driven by a motor or fly-wheel and movable or rotatable to engage with or disengage from the cam mechanism, a first engaging device bearing a magnetic head and engageable with the cam mechanism, a second engaging device for locking the pulley or gear device when it is spaced from the cam mechanism, and an operating device for operating the second device. With the disclosed magnetic head height changing apparatus, when the second device is operated by the operating device to release the locking of the pulley or gear device and to make it contact with the cam mechanism to rotate the same by a predetermined value, the second engaging device again locks the pulley or gear device to stop the rotation of the cam mechanism to hold the magnetic head at a predetermined height.

3 Claims, 4 Drawing Figures

MAGNETIC HEAD HEIGHT CHANGING DEVICE

BACKGROUND OF THE INVENTION

1. Field of the Invention

The present invention relates generally to a magnetic head height changing apparatus, and more particularly to a magnetic head height changing apparatus for a cartridge type magnetic tape recording and/or reproducing apparatus.

2. Description of the Prior Art

In the prior art, such a device is rather complicated in construction and bulky in size.

SUMMARY OF THE INVENTION

Accordingly, it is a main object of the present invention to provide a magnetic head height changing apparatus simple in construction, small in size, light in weight and small in electric power consumption.

According to the present invention there is provided a magnetic head height changing apparatus which comprises a cam mans having a cam surface on its one surface and claws on its periphery, a pulley or gear means which is driven by a motor or fly-wheel and movable or rotatable to engage with the periphery of the cam means and disengage therefrom, a first engaging means which bears a magnetic head and engageable with the cam surface, a second engaging means for locking the pulley or gear means when it is spaced from the periphery of the cam means, and an operating means for operating the second engaging means, whereby when the second engaging means is operated by the operating means to release the locking of the pulley or gear means and to make it contact with the periphery of the cam means to rotate the cam by a predetermined value, the second engaging means again locks the pulley or gear means to stop the rotation of the cam means to hold the height of the magnetic head.

The other objects, features and advantages of the present invention will become more apparent from the following description taken in conjunction with the accompanying drawings.

DESCRIPTION OF THE PREFERRED EMBODIMENT

Figure 1:
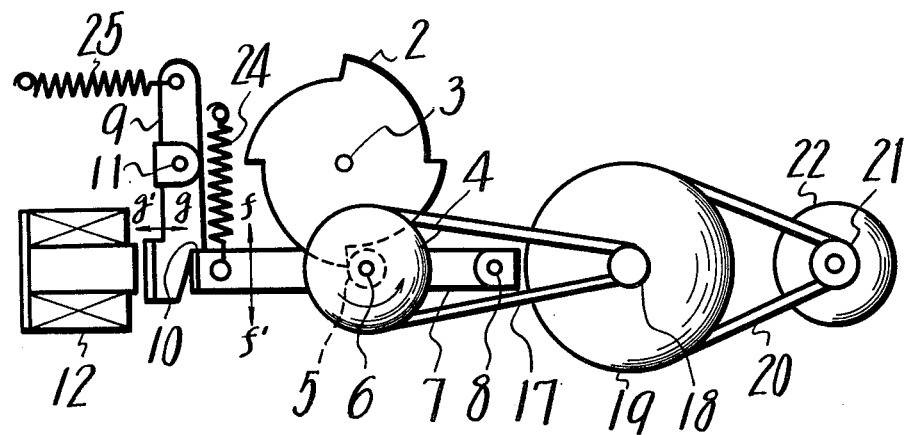
FIG. 1 is a schematic plan view for illustrating a driving part of an example of the present invention.

The construction of an example of a magnetic head height changing apparatus according to the present invention will be now described with reference to FIGS. 1 and 2.

In the figures, a head cam I with, for example, steps. A disc 2 has a plurality of claw projections, for example, four claw projections areound the periphery and is attached to the head cam 1. A shaft 3 supports the head cam 1 and the disc 2. A pulley 4 for the head cam 1 is provided and another pulley 5 made of, for example, rubber is attached to the pulley 4 to positively engage with the disc 2, the latter pulley 5 being engageable with the disc 2. The pulleys 4 and 5 are rotatably supported by a shaft 6 which is supported by a plate member 7 which is, at its one end, rotatably supported by a pin 8 which is attached to a base 23. A solenoid 12 is mounted on the base 23 and a plate 9, which may be driven by the solenoid, is rotatably supported, at its mid position, by a pin 11 attached to the base 23. The plate 9 has formed at its one end a claw 10 which may be engageable with the other end or free end of the plate member 7. The shaft 3 has supported on its part which projects through and below the base 23 a head support plate member 15, which supports a magnetic head 14 and a pin 13 for adjusting the position or height of the magnetic head 14. That is, the pin 13 passes upward through the base 23 to engage with the lower surface or cam surface of the cam 1. A spring 16 is stretched between the plate member 15 and the base 23 for normally biasing the plate member 15 in a direction shown by an arrow e in FIG. 2.

In the figures, reference numeral 22 designates a motor and 21 a pulley fixed to the rotary shaft of the motor 22. A shaft 24 is rotatably supported by the base 23 and has supported thereon a fly-wheel 19 and a pulley 18, respectively. A belt 20 is stretched between the pulleys 19 and 21 and another belt 17 is stretched between the pulleys 4 and 18, so that the rotation of the motor 22 is transmitted to the rubber pulley 5 to drive the disc 2 with the cam 1. Further, a spring 24 is stretched between the free end of the plate member 7 and the fixed part to bias the member 7 in the direction shown by an arrow f in FIG. 1 and a spring 25 is also provided between the one end of the plate 9 which does not have the claw 10 and the fixed part so as to bias the end of the plate 9 with the claw 10 in the direction shown by an arrow g in FIG. 1.

The cam 1 has formed on its side surface, which engages with the free end of the pin 13, a desired number of concave portions or steps of, for example, four steps, and the depths of or differences between each are selected to be suitable as required for the movement of the magnetic head 14 with respect to the base 23, so that, in accordance with the rotation of the cam 1, the height that the pin 13 protruded relative to the base 23 is varied to change the height of the magnetic head 14 with respect to the base 23.

Figure 3:
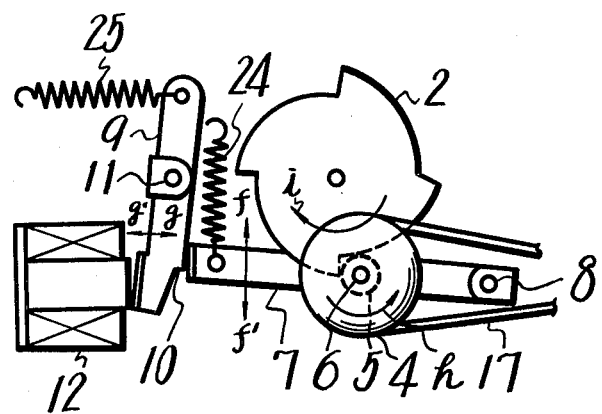
FIG. 3 is a plan view of one part of the example shown in FIG. 1 in one position.

When it is desired to change the height of the magnetic head 14 the solenoid 12 is energized a single time. Then the plate 9 is attracted by the solenoid 12, that is, the plate 9 is rotated around the pin 11 so that its end with the claw 10 is rotated in the direction of an arrow g' in FIGS. 1 and 3 against the spring force of the spring 25 and will be attracted to the solenoid 12 as shown in FIG. 3. At this time, the engagement of the claw 10 with the free end of the plate 7 is released with the result that the plate 7 is rotated by the spring force of the spring 24 in the direction f around the pin 8. When the plate 7 is rotated in the direction f, the rubber pulley 5 which is supported by the shaft mounted in the plate 7 engages with the recess of the claw formed in the disc 2 as shown in FIG. 3.

When the disc 2 engages with the rubber pulley 5, the former is rotated in direction i in FIG. 3 by the rotation of the rubber pulley 5 which is rotated in direction h in FIG. 3 through the belt 17. When the disc 2 is rotated, the rubber pulley 5 is shifted in the radial direction or the outside of the disc 2 in rotary contact with the periphery of the disc 2 so that the plate 7 with the pulleys 4 and 5 is rotated about pin 8 in the direction f' in FIG. 3 and slides on the claw 10 formed on the plate 9 which had already moved in the direction g about the pin 11 due to the spring force of the spring 25 because the solenoid 12 was deenergized at that time. This state is shown in FIG. 4.

Figure 2:
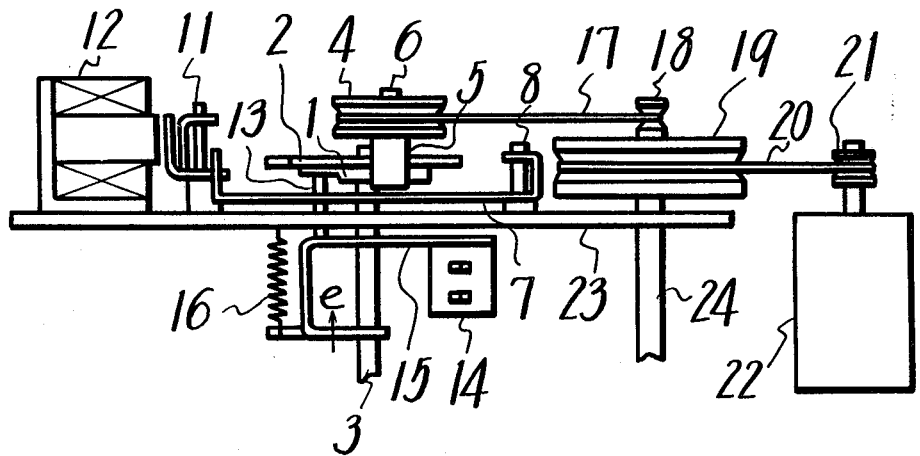
FIG. 2 is a side view of the example shown in FIG. 1 with a magnetic head.
Figure 4:
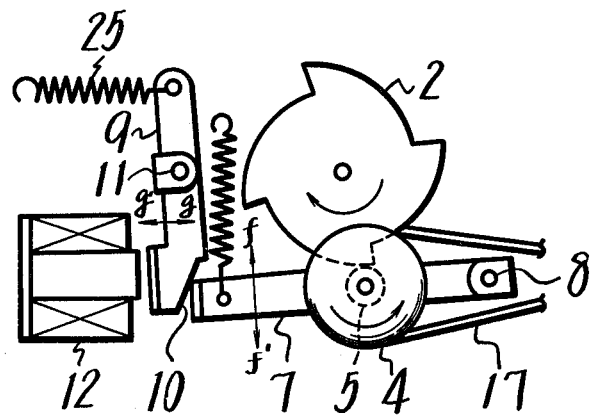
FIG. 4 is a plan view similar to that of FIG. 3 but different in position.

When the rubber pulley 5 has passed over the projection of the claw formed on the periphery of the disc 2, the plate 7 is turned, at its free end, about the pin 8 in the direction f in FIGS. 3 and 4 by the spring force of the spring 24 to engage with the claw 10 of the plate 9 and is held in that position, so that the rubber pulley 5 is kept apart from the disc 2 as shown in FIG. 1 and hence the rotation of the cam 1 is stopped. The above mentioned operation is repeatedly carried out for sequentially changing the height of the magnetic head 14 in accordance with the number of the claws formed on the periphery of the disc 2 and the steps of the cam 1. When the cam 1 and hence the disc 2 are rotated by one revolution, the magnetic head 14 returns to its initial height position.

With the present invention described above, the cam 1 is rotated the necessary amounts with the driving force from the fly-wheel 19 and the pulley 4 automatically returns to its initial stop position so that the solenoid 12 need only in practice to release the engagement of the claw 10 with the plate 7. Accordingly, the device can be made very small in size and its power consumption is very small since the solenoid can be small in capacity.

In the above example, the rotation of the motor is transmitted through the belts, pulleys and so on, but it may be possible to use a gear train for transmitting the rotation of the motor.

It will be apparent that many modifications and variations can be effected without departing from the spirit and scope of the novel concepts of the present invention.

I claim as my invention:

1. Apparatus for adjusting the position of a magnetic head comprising,
   a driving means,
   a first pivoted plate,
   a driving pulley mounted on said first pivoted plate away from the pivot point and driven by said driving means,
   a rotatably supported disc formed with a plurality of projections formed on its outer periphery having one abrupt edge and one gradually increasing edge and said driving pulley engageable therewith such that said driving pulley engages and drives said disc on said gradually increasing edge and falls into a non-driving position after passing said abrupt edge, said disc having a face cam formed on one of its side faces,
   a cam follower engageable with said face cam and said magnetic head to control its position,
   a second pivoted locking plate engageable with the first pivoted plate to lock it in a position such that said driving pulley is out of engagement with said disc,
   a solenoid mounted adjacent said second pivoted locking plate to move it to a position such that it frees said first pivoted plate,
   a first spring means connected to said first pivoted plate to bias it toward said disc, and
   a second spring connected to said second pivoted plate to bias it to the locking position.

2. A magnetic head height changing apparatus as claimed in claim 1 in which said face cam has four steps.

3. A magnetic head height changing apparatus as claimed in claim 1 in which said pulley engageable with the cam means is made of rubber.

* * * * *